United States Patent [19]

Yamazaki et al.

[11] 4,366,678

[45] Jan. 4, 1983

[54] TEMPERATURE CONTROL APPARATUS FOR REFRIGERATING MACHINE

[75] Inventors: Susumu Yamazaki; Yosinari Nagoya; Ryoichi Fujimoto, all of Ohiramachi; Koichi Nozaki, Kodaira; Terukazu Shirakata, Soka; Kazuyoshi Yamaguchi, Mitaka, all of Japan

[73] Assignee: Hitachi, Ltd., Tokyo, Japan

[21] Appl. No.: 221,721

[22] Filed: Dec. 31, 1980

[30] Foreign Application Priority Data

Jan. 7, 1980 [JP] Japan .................................... 55/151

[51] Int. Cl.³ ...................... F25D 17/04; G05D 15/00
[52] U.S. Cl. ........................................ 62/186; 236/75; 251/129; 307/252 B
[58] Field of Search .................. 251/129; 236/75; 62/186; 361/209, 161; 307/252 B, 262

[56] References Cited

U.S. PATENT DOCUMENTS

| | | | |
|---|---|---|---|
| 3,893,307 | 7/1975 | Jacobs | 62/186 X |
| 4,158,164 | 6/1979 | Nutz | 307/252 B X |
| 4,265,394 | 5/1981 | Nagel | 307/252 B X |

Primary Examiner—William E. Wayner
Attorney, Agent, or Firm—Antonelli, Terry & Wands

[57] ABSTRACT

A temperature control apparatus for use in a refrigerating machine, wherein an a.c. control element and the solenoid coil of a holding type solenoid are connected in series in an a.c. power circuit, the holding type solenoid serving to actuate a damper for opening and closing the outlet for ejecting cooled air into the refrigerating chamber, and also a temperature sensor for detecting the temperature in the refrigerating chamber and a triggering circuit for triggering the a.c. control element are provided in the a.c. power circuit. The triggering circuit supplies a trigger signal to the control electrode of the a.c. control element at a predetermined period in synchronism with the phase of the current from the a.c. power source in response to the output of the temperature sensor, so that the solenoid coil is energized to drive the damper.

6 Claims, 6 Drawing Figures

TEMPERATURE CONTROL APPARATUS FOR REFRIGERATING MACHINE

This invention relates to a temperature control apparatus for use in a refrigerating machine or the like, and more particularly to an improvement in a temperature control apparatus having a damper for opening and closing a duct through which cooled air from a refrigerator is ejected into a refrigerating chamber.

The conventional temperature control apparatus used in a refrigerating machine currently purchasable on the market, is provided with a damper thermostat for controlling the flow of cooled air, the damper thermostat being provided in the duct through which the cooled air from the refrigerator is guided into the refrigerating chamber. The damper thermostat picks up the expansion or compression of bellows corresponding to the change in the volume of gas sealed in a thermosensitive tube, depending on the temperature of the air in the refrigerating chamber. The sensed geometrical change in the bellows is transferred, by means of, for example, an operating rod, to the blade of a damper which blade opens or closes the duct for the control of the flow of the cooled air.

In such a damper having a gas-actuated thermostat as described above, a heater for preventing an erroneous operation is usually provided for the parts of the thermostat assembly other than the thermosensitive element so as to keep the temperature of the element lowest. The heater for preventing erroneous operation is continuously energized since it is used to keep the thermostat element warmer than the other parts of the thermostat assembly. Consequently, even though the capacity of the heater is as small as about 1-2 W, the accumulated consumption of electric power over a month or a year becomes considerable. Moreover, the customary provision of the thermostat assembly close to or in the refrigerating chamber causes the heater for preventing erroneous operations to be a heat generating load associated with the refrigerating chamber. This situation therefore counteracts the policy of electric power economization now in progress.

The object of this invention is to provide a temperature control apparatus for use in a refrigerating machine, free from the above described drawback incidental to the conventional equivalent.

According to this invention, which has been made to attain the object, to promote the electric power economization, the temperature of the refrigerating chamber is electrically controlled without resorting to the conventional temperature control system (gas thermostat system) that counteracts the energy economization policy. Namely, an a.c. current control element and a holding type solenoid are connected in series with each other and inserted in the a.c. power circuit, the holding type solenoid serving to actuate a damper for opening and closing the outlet for ejecting cooled air into the refrigerating chamber, and positive or negative pulses synchronous with the a.c. current flowing through the a.c. power circuit are applied at a constant period to the holding type solenoid in response to the signal from the temperature sensor for sensing the temperature of the refrigerating chamber. In the drawings:

Figure 3:
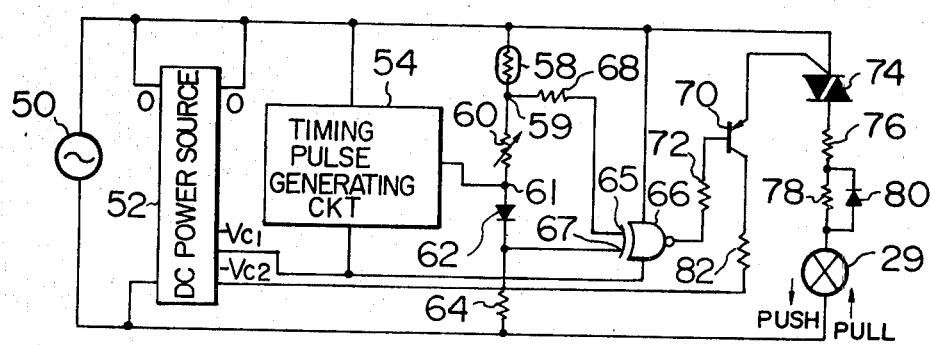
Figure 4:
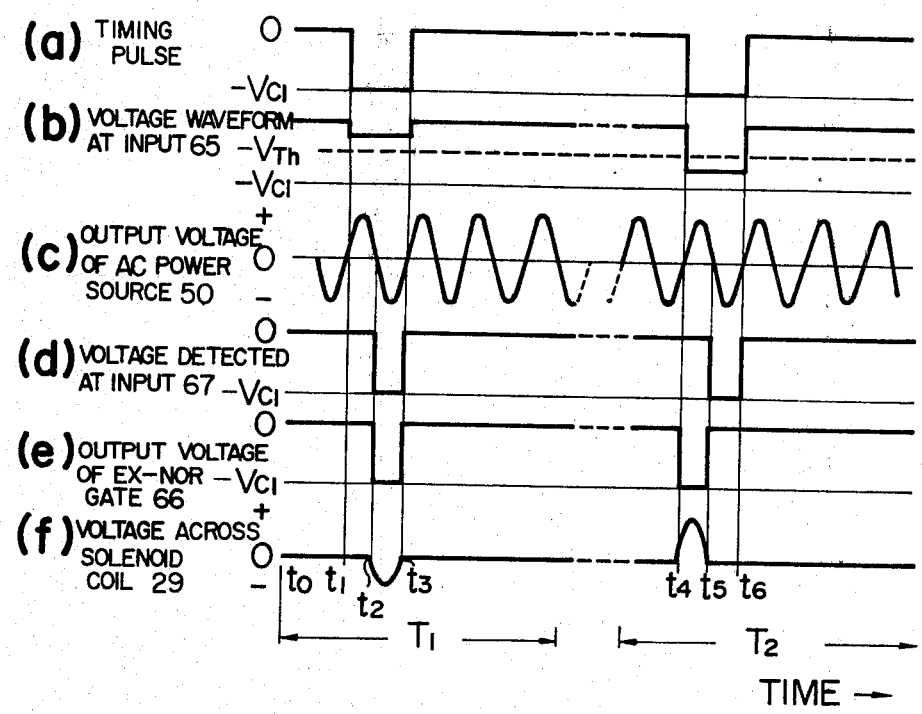
Figure 5:
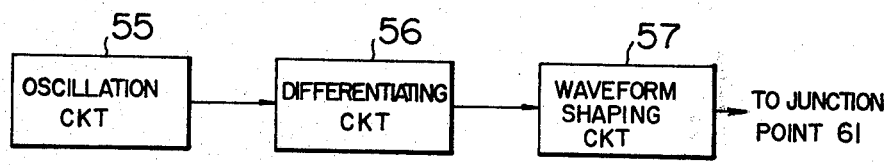

FIG. 3 schematically shows the solenoid drive circuit serving as a part of the temperature control apparatus according to this invention;

FIG. 4 is a time chart useful in explaining the operation of the solenoid drive circuit shown in FIG. 3;

FIG. 5 shows in block diagram a timing pulse generating circuit; and

Figure 6:
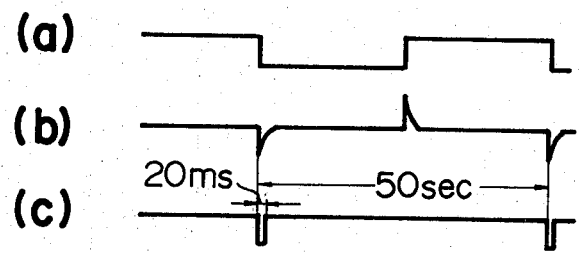

FIG. 6 is a time chart useful in explaining the operation of the timing pulse generating circuit shown in FIG. 5.

Figure 1:
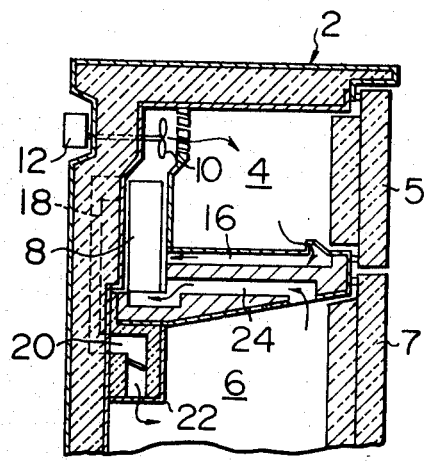
FIG. 1 shows in sectional view a main portion of a refrigerating machine having a temperature control apparatus embodying this invention.

This invention will now be described in detail by way of embodiment with the aid of the attached drawings. FIG. 1 shows in sectional view a main portion of a refrigerating machine having a temperature control apparatus to which this invention is applied. In FIG. 1, reference numeral 2 designates a refrigerating machine itself moulded with insulating adiabatic material, which comprises a freezing chamber 4 and a refrigerating chamber 6. Numeral 8 indicates a refrigerator and 10 a fan driven by an electric motor 12. Air cooled by the refrigerator 8 is blown into the freezing chamber 4 by the fan 10 and further sent back to the refrigerator 8 through a duct 16. On the other hand, the air cooled by the refrigerator 8 is also sent into the refrigerating chamber 6 through a duct 18. The outlet of the duct 18 is provided with a damper 22 for controlling the amount of air ejected into the refrigerating chamber. The air, after having circulated throughout the refrigerating chamber, is sent back to the refrigerator 8 through a duct 24.

Figure 2:
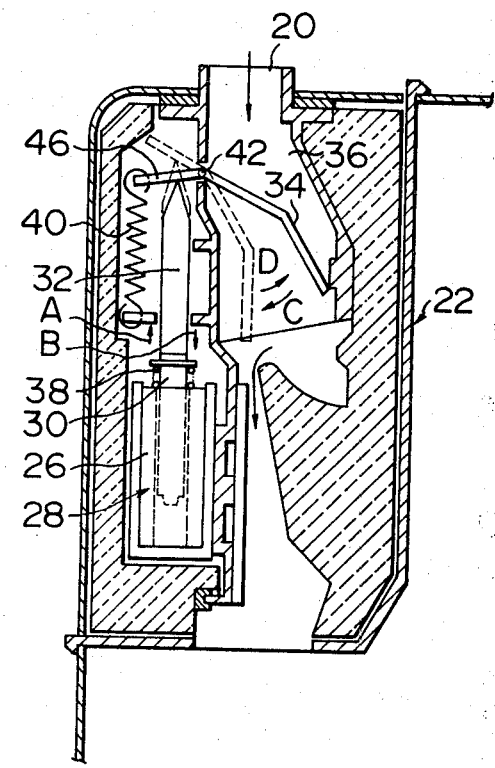
FIG. 2 shows in detail the damper serving as a part of the temperature control apparatus according to this invention.

FIG. 2 shows the details of the damper 22. In FIG. 2, numeral 28 designates a holding type solenoid comprising a permanent magnet 26, a movable iron core 30 and a solenoid coil (not shown). An operating rod 32 has its one end fixed to the movable iron core 30. A compression spring 38 in the form of a helical coil is fitted between the end of the operating rod 32 and the permanent magnet 26 so that the rod 32 may be urged in the direction indicated by an arrow A due to the expansion force of the spring 38. The outlet 20 communicates with the refrigerating chamber 6 via a duct 36. A blade 34, which is swingably supported on a pivot 42, serves to control the flow of air through the duct 36. An extension spring 40 in the form of a helical coil is anchored between one end 46 of the blade 34 and a portion of the damper wall, urging the end 46 of the blade 34 downward as seen in the picture.

With this damper, when the movable iron core 30 is moved in the direction indicated by an arrow B against the extending force of the coil spring 38 by conducting a current sufficient for attracting the iron core to the magnet in one direction through the solenoid coil, the movable iron core 30 is attracted to the magnet 26 as shown by a solid line in FIG. 2. Once the iron core is attracted to the magnet, it is kept to be attracted thereto even after deenergizing the solenoid coil. Thus, the operating rod 32 also moves to the direction indicated by the arrow B and shifts to a position indicated by a solid line so that the blade 34 is rotated in the direction indicated by an arrow D to a position shown by a solid line by the compressive force of the coil spring so that the duct 36 is occluded.

On the other hand, when the solenoid coil is energized by conducting a current in the other direction for partially cancelling the attractive force of the magnet 26, the movable iron core 30 moves in the direction indicated by the arrow A against the attractive force of the magnet by the extending force of the coil spring 38 so that the operating rod 32 shifts to a position indicated by a dotted line. The blade 34 is in turn rotated to the direction indicated by an arrow C against the compressive force of the coil spring 40 so that the duct 36 is opened.

It is required to flow a large current through the solenoid coil in case of attracting the movable iron core 30 to the magnet 26 since the movable iron core is moved against the extending force of the spring coil 38. On the other hand, in case of releasing the movable iron core from the attracting force of the magnet to restore it to an upper position in FIG. 2, it is sufficient to flow through the solenoid coil a current smaller than that required in case of attracting the movable iron core, since the current is required to act only for partially cancelling the magnetic force of the magnet.

FIG. 3 schematically shows a circuit for driving the solenoid 28 by an a.c. source without using any transformer. The operation of this circuit will be explained by the aid of FIG. 4 which shows various waveforms appearing at several points in the circuit.

In FIG. 3, an a.c. power source 50 continuously supplies such a sinusoidal wave (c) as shown in FIG. 4. A d.c. power source 52 has its primary side connected across the a.c. power source 50 and its secondary side. The secondary side has three terminals, one connected to a common line 51, another supplying a voltage $-V_{c1}$ to a timing pulse generating circuit 54 and an exclusive NOR gate 66, and the other supplying a voltage $-V_{c2}$ to the collector of a transistor 70 through a resistor 82.

The timing pulse generating circuit 54 comprises an oscillation circuit 55, a differentiating circuit 56 and a waveform shaping circuit 57, as shown in FIG. 5, and these respective circuits are fed by the d.c. power source 52. The oscillating circuit 55 generates a signal (a) shown in FIG. 6 having, for example, a period of about 50 sec. and a duty cycle of about 50%, which signal is then supplied to the differentiating circuit 56. The differentiating circuit 56 differentiates the signal (a) shown in FIG. 6 to deliver a signal (b) as shown in FIG. 6 which is the differentiated version of the signal (a). The waveform shaping circuit 57 receives the output of the circuit 56, i.e. the differentiated signal (b), and in turn delivers a train of timing pulses (c) in FIG. 6, each of which is preferably at low level for about 20 m sec. after the pulse falling instant of the output signal (a) of the oscillation circuit 55. The period during which the timing pulse is at low level is about one cycle of the output voltage of the a.c. power source 50. This train of timing pulses is the output signal of the timing pulse generating circuit 54. As a temperature sensor 58 is usually used a thermistor whose resistance becomes low or high according as the temperature detected in the refrigerating chamber becomes high or low. A variable resistor 60 is connected in series with the thermistor 58. By changing the resistance value of the variable resistor 60, the potential at a junction point 59 of the thermistor 58 and the variable resistor 60 is controlled to control the preset temperature to be kept in the refrigerating chamber. Reference numeral 62 designates a diode and 64 a resistor. Thus, the temperature sensor 58, the variable resistor 60, the diode 62 and the resistor 64 are connected in series and this series circuit is in turn connected in parallel with the a.c. power source 50 and the d.c. power source 52.

The output of the timing pulse generating circuit 54 is applied to a junction point 61 between the variable resistor 60 and the diode 62.

The exclusive NOR gate 66 has its one input (first input) terminal 65 connected with the junction point 59 through a resistor 68 and the other input (second input) terminal 67 connected with a junction point between the diode 62 and the resistor 64.

The operation of the exclusive NOR gate 66 will be described below. The exclusive NOR gate 66 is a logic circuit with a high input impedance such as a C-MOS type. The voltage to be applied to the first input terminal 65 is determined depending on the voltage at the junction point 59. Namely, if the voltage of the timing pulse (a) in FIG. 4 from the timing pulse generating circuit 54 is at the high level, the voltage at the junction point 59 is at the high level so that the voltage at the terminal 65, i.e. the waveform (b) in FIG. 4, is at the high level. If the timing pulse assumes the low level, the voltage at the junction point 59 is of a value obtained by dividing the voltage of the d.c. power source by the thermistor 58 and the resistor 60. If the temperature in the refrigerating chamber is higher than the preset level determined by the resistor 60, that is, if the resistance value of the thermistor 58 is small, as represented during a period $T_1$ in FIG. 4, then the voltage at the junction point 59 during the period $t_1-t_3$ for which the timing pulse is at the low level, is slightly lower than the voltage during the period where the timing pulse is at the high level. Accordingly, the voltage of the input to the terminal 65 assumes a level a little lower than the level which it assumes during a period $T_0-T_1$. However, since this lower level is higher than the gating sensitivity threshold level $-V_{TH}$, the input to the terminal 65 remains the same at the high level. On the contrary, if the temperature in the refrigerating chamber is lower than the preset level, that is, if the resistance value of the thermistor is large as represented during a period $T_2$ in FIG. 4, then the voltage at the junction point 59 during the period $t_4-t_6$ for which the timing pulse assumes the low level, is lower than during the period $t_1-t_3$. Accordingly, the voltage of the input to the terminal 65 is lower than the threshold level $-V_{TH}$, being at the low level. If the variable resistor 60 is controlled, the voltage dividing ratio obtained by the thermistor 58 and the resistor 60 is also controlled. Therefore, the level of the voltage applied at the terminal 65 during the period for which the timing pulse has the low level, can be adjusted so that the preset temperature for the refrigerating chamber can be adjusted.

The voltage at the terminal 67 is at the high level when the voltage at the junction point 61 is at the high level since the diode is connected between the junction point 61 and the second input terminal 67. If the voltage at the junction point 61 is at the low level, the voltage at the terminal 67 varies depending on the a.c. power source voltage applied to the terminal 67 through the resistor 64. Namely, when the timing pulse is at the high level, the voltage detected at the terminal 67 is at the high level as shown by a waveform (d) in FIG. 4. When the timing pulse is at the low level, the voltage (d) in FIG. 4 is at the high or low level according as the voltage from the a.c. power source is positive or negative. Therefore, the voltage (d) detected at the terminal 67 is low level for a period $t_2-t_3$ and a period $t_5-t_6$. In this way, the second input of the exclusive NOR gate serves to detect the phase of the voltage from the a.c. power source.

The exclusive NOR gate 66 delivers an output at the high level when the levels of the inputs to the terminals 65 and 67 are the same, that is, when both the levels are high or low, and an output at the low level when the two inputs have the opposite levels, as shown by the waveform (e) in FIG. 4.

As described above, when the timing signal is at the low level, the voltage detected at the terminal 65 varies depending on the temperature of the air in the refrigerating chamber while the voltage detected at the terminal 67 changes in accordance with the phase of the voltage of the a.c. power source. Therefore, when the timing pulse is at the low level, the output of the exclusive NOR gate is at the low level during every negative half cycle of the a.c. power source voltage if the actual temperature in the refrigerating chamber is higher than the preset value while the output of the exclusive NOR gate is at the low level during every positive half cycle of the a.c. power source voltage if the actual temperature is lower than the preset one.

The preset temperature for the refrigerating chamber is selected by controlling the resistance of the variable resistor 60.

In FIG. 3, a switching element, e.g. PNP transistor, 70 has its base connected via a resistor 72 for limiting a current to the output of the exclusive NOR gate 66. An alternating current control element 74 with a control electrode, e.g. triac, is provided in the a.c. circuit, the control electrode, i.e. gate, of the element 74 being connected with the emitter of the transistor 70. The holding type solenoid 28 has its solenoid coil 29 connected in series with the a.c. control element 74.

Resistors 76 and 78 are connected in series for current limitation between the element 74 and the solenoid coil 29. A diode 80 is connected in parallel with the resistor 78 and becomes conductive only when the movable iron rod 30 is moved in the direction indicated by the arrow B in FIG. 2. The diode 80 becomes conductive and nonconductive when the current flows in the direction of the arrows PULL and PUSH respectively. Thus, the current flowing through the solenoid coil 29 in the direction of the arrow PULL is larger than that in the direction of the arrow PUSH. This is because a current value required for pulling the movable iron core in the direction of the arrow B is larger than that required for pushing the movable iron core in the direction of the arrow A. Then, the movable iron core 30 of the solenoid 28 is driven in the following manner.

The voltage at the junction point 61 of the variable resistor 60 and the diode 62 assumes the low level for about 20 m sec every 50 seconds in response to the output signal of the timing pulse generating circuit 54, as shown in FIG. 4(a). In the case of the voltage at the junction point 61 being at the low level, if the thermistor 58 for detecting the temperature of the refrigerating chamber detects a temperature higher than the preset value as in the period $t_1$–$t_3$, the resistance of the thermistor 58 decreases so that the voltage at the junction point 59 assumes the high level. Thus, the input terminal 65 of the exclusive NOR gate 66 receives the high level signal. On the other hand, an a.c. component is also applied to the input terminal 67 of the exclusive NOR gate 66 through the resistor 64. Consequently, the terminal 67 receives the signal (d) in FIG. 4 which is at the low level during the period $t_2$–$t_3$ and the exclusive NOR gate 66 delivers the signal (e) in FIG. 4 which is at the low level during the period $t_2$–$t_3$. The output of the gate 66 is supplied to the base of the transistor 70 through the resistor 72. The transistor 70 is conductive only when this output of the gate 66 is at the low level, so that the triac 74 is triggered. Accordingly, the triac 74 becomes conductive during the period $t_2$–$t_3$ for which the output of the exclusive NOR gate 66 is at the low level, and the a.c. current for the positive or negative half cycles, especially for the negative half cycles in this case shown in FIG. 4, is supplied to the solenoid coil 29. Current flows through the solenoid coil 29 in the direction of the arrow PUSH and the waveform of the voltage across the solenoid coil 29 is as shown in FIG. 4(f). Since the magnetic force of the magnet 26 is partially cancelled by flowing the current through the solenoid coil 29 in the direction of the arrow PUSH, the movable iron core 30 is shifted in the direction of the arrow A by the extending force of the coil spring 38. Therefore, the blade 34 is rotated in the direction of the arrow C, to open the duct. Consequently, the cooled air from the refrigerator 8 is ejected into the refrigerating chamber 6 so that the temperature in the refrigerating chamber is lowered.

If, on the other hand, the thermistor 58 senses the fall of the temperature of the refrigerating chamber 6 below the preset one, the resistance of the thermistor 58 increases. When the temperature of the chamber 6 falls below the preset one during the period for which the timing pulse is at the low level, the level of the voltage at the terminal 65 becomes low. Input voltage level detected at the second input terminal 67 is high during the period $t_4$–$t_5$ and high during the period of $t_5$–$t_6$. The output of the exclusive NOR gate 66 is at the low level for the period $t_4$–$t_5$, as shown in FIG. 4. The triac 74 is rendered conductive during the period $t_4$–$t_5$ so that the a.c. current for the positive or negative half cycles, especially for the positive half cycles in this case, of the a.c. power source is supplied to the solenoid coil 29, as shown in FIG. 4(f). Accordingly, current flows through the coil 29 in the direction of the arrow PULL in FIG. 3. This current is greater than that in the direction of the arrow PUSH. Therefore, the movable iron core 30 is shifted in the direction of the arrow B against the counteracting force of the spring 38 so that the blade 34 is rotated in the direction of the arrow D. Consequently, the duct 36 is occluded to stop the supply of cooled air into the refrigerating chamber 6.

In the embodiment described above, if the detected temperature is higher than the preset one, the current flows through the solenoid coil 29 in the direction of the arrow PUSH to open the duct by the blade, but it is also possible to design the damper in such a manner that the current flows through the solenoid coil in the direction of the arrow PULL to open the duct.

As described above, according to this invention, the a.c. control element and the solenoid coil of the holding type solenoid are connected in series in the a.c. power circuit, the holding type solenoid serving to actuate the damper for opening and closing the outlet for ejecting cooled air into the refrigerating chamber, and positive or negative pulses synchronous with the a.c. current flowing through the a.c. power circuit are applied at a constant period to the holding type solenoid in response to the signal from the temperature sensor. Therefore, since the solenoid coil draws an intermittent current, the power consumed to open and close the damper is rendered very small or negligible. Moreover, since the solenoid which was usually driven by d.c. current is driven by the use of the conventional a.c. elements, the cost of the consequent product can be decreased. Further, since the temperature in the refrigerating chamber can be controlled by the use of a holding type solenoid, instead of by the conventional gas-actuated damper thermostat, the heater for preventing erroneous operations, used in the conventional refrigerating machine and requiring constant power supply, can be eliminated. In addition, the solenoid used in this invention can withstand a current greater than the rated one since the current flows through the solenoid coil for only a very short period of time, and also the solenoid never forms a thermal load since it generates little heat.

What is claimed is:

1. A temperature control apparatus for use in a refrigerating machine, comprising
    an a.c. power source;
    an a.c. control element with a control electrode, connected with said a.c. power source;
    a holding type solenoid for driving a damper which opens and closes the duct for guiding cooled air from the refrigerator to the refrigerating chamber, said solenoid having a solenoid coil being connected in series with said a.c. control element;
    a temperature sensor for detecting the temperature in said refrigerating chamber and for delivering an output corresponding to the detected temperature; and
    a triggering means for supplying a trigger signal in synchronous with the phase of the output voltage from said a.c. power source determined in accordance with the output of said temperature sensor, to said control electrode of said a.c. power source at a predetermined period.

2. A temperature control apparatus as claimed in claim 1, wherein said triggering means includes
    a timing pulse generating circuit for generating timing pulses having the repetition frequency smaller than that of said a.c. power source,
    a phase detecting circuit for detecting the phases of said output voltage of said a.c. power source in response to the timing pulse, and
    a triggering element for supplying a triggering signal to said a.c. control element in response to the outputs of said phase detecting circuit and said temperature sensor, wherein said temperature sensor supplies an output corresponding to said detected temperature to said triggering element in response to said timing pulses and said triggering element triggers said a.c. control element in synchronism with one of the detected phases of said phase detecting circuit which is determined in accordance with said output of said temperature sensor.

3. A temperature control apparatus as claimed in claim 2, wherein the trigger phase of said triggering element when the temperature detected by said temperature sensor is higher than the preset one, is opposite to that when the detected temperature is lower than said preset one, and said solenoid is so actuated as to close said damper when said detected temperature is higher than said preset one and to open said damper when said detected temperature is lower than said preset one.

4. A temperature control apparatus as claimed in claim 3, wherein said triggering element triggers said a.c. control element in response to the detection of one of the positive and negative half cycles of the voltage from said a.c. power source by said phase detecting circuit when the temperature detected by said temperature sensor in response to said timing pulses is higher than the preset temperature, said triggering element triggers said a.c. control element in response to the detection of the other half cycle of said voltage from said a.c. power source by said phase detecting circuit when said detected temperature is lower than said preset one, said a.c. control element becomes conductive during selected one of said positive and negative half cycles in response to the trigger signal from said triggering element.

5. A temperature control apparatus as claimed in claim 3, wherein said triggering means further includes a correcting element for correcting the output of said temperature sensor and applying the corrected value to said triggering element, said preset temperature being changeable by correcting the output of said temperature sensor.

6. A temperature control apparatus as claimed in claim 4, wherein the amplitude of the current flowing through said solenoid coil during the positive half cycles of said a.c. power source is different from that during the negative half cycles of said a.c. power source.

* * * * *